United States Patent [19]

Hanson, Jr. et al.

[11] Patent Number: 5,019,171
[45] Date of Patent: May 28, 1991

[54] RECLAIMING INORGANIC REINFORCEMENT COMPONENT FROM ORGANIC RESIN-CONTAINING SCRAP MATERIALS

[75] Inventors: David G. Hanson, Jr., Calumet; William A. Hockings, Houghton, both of Mich.

[73] Assignee: Peninsula Copper Industries, Inc., Hubbell, Mich.

[21] Appl. No.: 233,619

[22] Filed: Aug. 18, 1988

[51] Int. Cl.$^5$ ............................................. C03C 23/00
[52] U.S. Cl. ........................................... 134/2; 134/10; 134/35; 65/2; 432/72; 432/186
[58] Field of Search .................... 134/2, 10, 11, 42, 39, 134/35; 65/2; 55/14; 432/59, 149, 72, 186

[56] References Cited

U.S. PATENT DOCUMENTS

| | | | |
|---|---|---|---|
| 4,400,154 | 8/1983 | Lientz | 432/242 |
| 4,439,141 | 3/1984 | Deckebach | 432/106 |
| 4,683,664 | 8/1987 | Codenotti | 432/72 |
| 4,789,332 | 12/1988 | Ramsey et al. | 432/59 |

Primary Examiner—Anthony McFarlane
Attorney, Agent, or Firm—Michael, Best & Friedrich

[57] ABSTRACT

An inorganic reinforcement component, such as fiberglass, is reclaimed from a scrap material including a vaporizable organic resin, such as epoxy, by heating the scrap material in an elongated, rotary furnace to a temperature above the vaporization point of the organic resin and below a point where the structural integrity of the reinforcement material is degraded. A purge gas flowing through the furnace countercurrently to the moving bed of scrap material sweeps away volatized gases, the organic reinforcement component is withdrawn from the outlet end of the furnace and a stream of combined gases including the purge gas and the volatized organic material is withdrawn from the inlet end of the furnace.

13 Claims, 2 Drawing Sheets

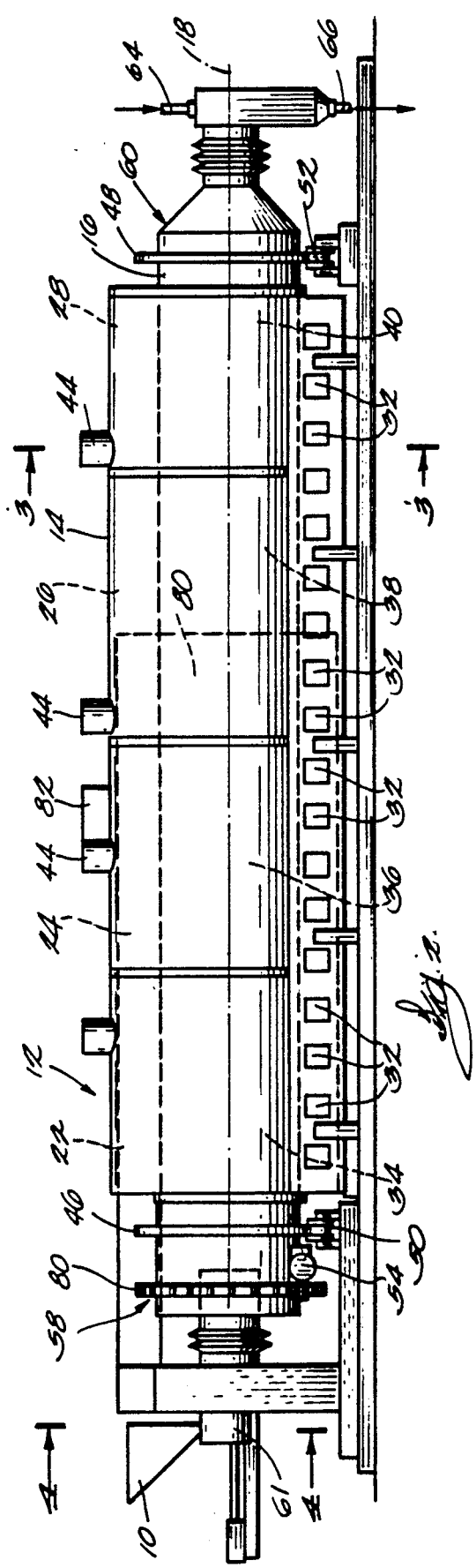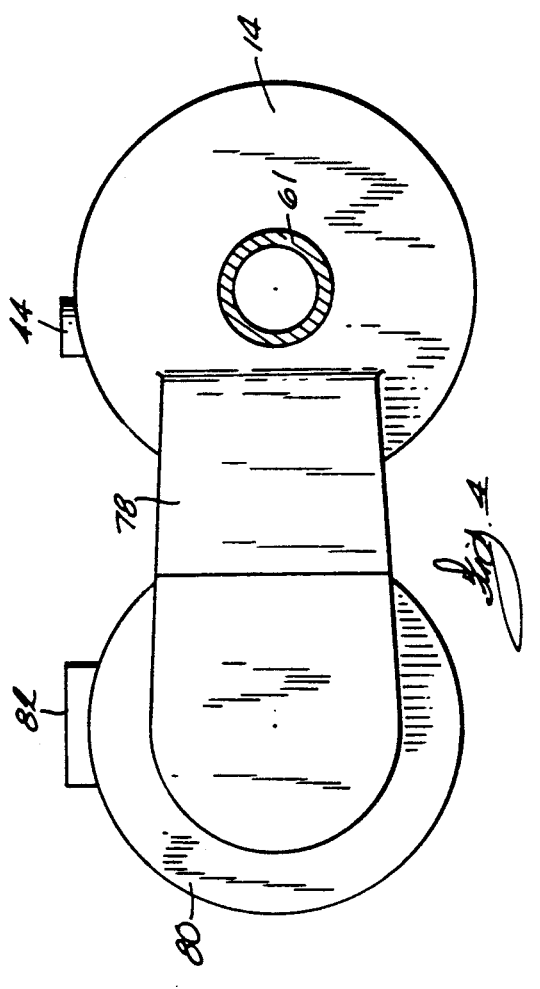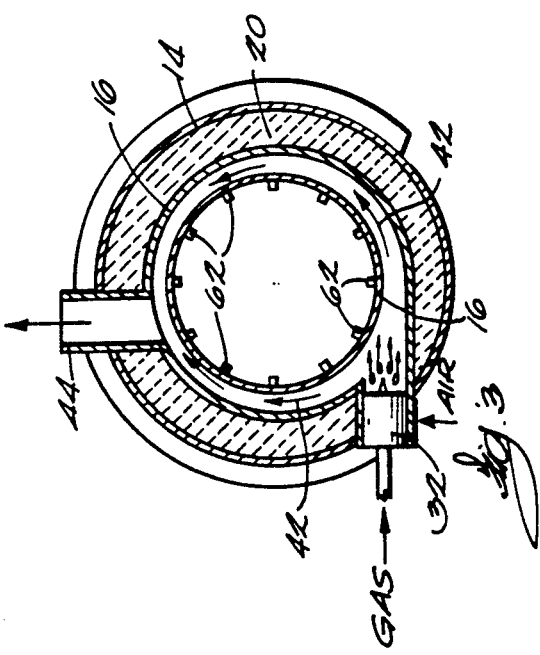

RECLAIMING INORGANIC REINFORCEMENT COMPONENT FROM ORGANIC RESIN-CONTAINING SCRAP MATERIALS

BACKGROUND OF THE INVENTION

This invention relates to processes for reclaiming the inorganic reinforcing component from scrap materials including a vaporizable organic resin, such as fiberglass-reinforced compositions.

Composite materials including an organic resin reinforced with an inorganic compound, such as fiberglass-reinforced, plastic composites, etc., are used for a wide variety of applications. The production of parts from such composite materials, such as automobile parts, boat hulls and decks, tub and shower enclosures, laminated circuit boards and the like, results in a large amount of scrap as trimmings, out-of-specification production, etc. Also, scrap is generated when such parts are broken, worn out, etc. Currently, the bulk of this scrap is used as landfill or incinerated in municipal solid waste incinerators.

Recycling or salvaging the inorganic reinforcement component from such scrap materials is highly desirable because production costs can be reduced and problems associated with disposal of the scrap can be eliminated or at least minimized. Heretofore, attempts to recycle such composite materials have not been commercially feasible. One of the reasons many automobile manufacturers have not used fiberglass-reinforced plastic material more extensively is because of an inability to recycle the scrap.

Many processes for recycling fiberglass-reinforced plastic materials have focused on recovering the organic resin for heat recovery. Various processes have been used to reclaim the fiberglass fibers from mat products such as insulating materials. In one method, the mat is heated to an elevated temperature to volatize and drive off the binder which usually is about 5 to 15 wt. % of the mat. Examples of such a method are disclosed in U.S. Pat. Nos. 3,847,664, 3,852,108, 4,397,692 and 4,511,328.

U.S. Pat. No. 4,432,780 discloses a method for reclaiming chemically coated glass scrap wherein the scrap is introduced into a glass melting furnace along with an oxidizing gas, the chemical coating is oxidized and the glass fibers eventually become part of the glass melt. U.S. Pat. No. 3,448,702 discloses an incinerating method for recovering metal from printed circuit boards made from a fiberglass-epoxy laminate. The scrap is introduced into an incinerator including a forced combustion burner which impinges a high velocity stream of pressurized combustion air directly on the scrap material and scatters the metal residue and glass fibers away from the burner.

None of these patents disclose using a rotary furnace and a countercurrent flow of a purge gas for reclaiming fiberglass or other inorganic reinforcement components from scrap materials including an organic resin reinforced by the organic reinforcement component.

SUMMARY OF THE INVENTION

An Object of the invention is to provide an effective process for reclaiming an inorganic reinforcement component, such as fiberglass, from a scrap material including a vaporizable organic resin reinforced by such reinforcement component.

Another object of the invention is to provide such a process which can be controlled to avoid degradation of the reclaimed inorganic reinforcement component.

A further object of the invention is to provide such a process which can be used to reclaim fiberglass from fiberglass-organic resin laminates, particularly those used as substrates for printed circuit boards.

A still further object of the invention is to provide such a process which is capable of recovering other inorganic chemicals from the scrap material.

Other objects, aspects and advantages of the invention will become apparent to those skilled in the art upon reviewing the following detailed description, the drawings and the appended claims.

The invention provides a process for reclaiming an inorganic reinforcement component, such as fiberglass, from a scrap material including a vaporizable organic resin, such as an epoxy. The process includes the steps of introducing the scrap material into an elongated, rotary furnace, heating the scrap in the furnace to a temperature above the vaporization point of the organic resin and below a point where the structural integrity of the reinforcement component is degraded, while a bed of the scrap material is being tumbled and moves from the inlet end toward the outlet end of the furnace, passing a flow of purge gas through the furnace countercurrently to the moving bed of scrap material to sweep away volatized gases, withdrawing the inorganic reinforcement component from the outlet of the furnace and withdrawing a stream of combined gases including the purged gas and the volatized gases from the inlet end of the furnace. The scrap material preferably is heated to a temperature within the range of about 850° to about 1050° F.

In one embodiment, the combined gases from the furnace are introduced into an afterburner and heated therein to an elevated temperature to complete combustion of substantially all the hydrocarbons. The heat in the flue gases from the afterburner can be recovered for use to generate steam, in a building heating system, to dry materials, etc.

If the scrap material contains a halide, such as a bromide-type flame retardant, or other vaporizable additive, the stream of combined gases from the furnace can be contacted with a reactant capable of reacting with the halide to produce a salt which is recovered. In a preferred embodiment, a spray dryer is used for this purpose.

BRIEF DESCRIPTION OF THE DRAWING

FIG. 2 is a side view and partially diagrammatic representation of a rotary furnace and afterburner which can be used in the process illustrated in FIG. 1.

FIGS. 3 is a sectional view taken generally along line 3—3 in FIG. 2.

FIG. 4 is a sectional view taken generally along line 4—4 in FIG. 2.

DESCRIPTION OF THE PREFERRED EMBODIMENTS

The process of the invention can be used to recover various inorganic compositions from a wide variety of scrap materials including a vaporizable organic resin reinforced with one or more inorganic reinforcement components. It is particularly adaptable for use in reclaiming fiberglass from epoxy-fiberglass composites and will be described in connection with reclaiming a woven fiberglass fabric from epoxy-fiberglass composites used in the manufacture of printed circuit boards and containing an inorganic bromide-type fire retardant.

The production of high pressure, laminated, copper clad, fiberglass-reinforced epoxy laminates for printed circuit boards generates substantial tonnage of scrap. One source of such scrap is edge trimmings from presses used in producing the boards. Other sources are off-specification material and used printed circuit boards which are discarded because of age, malfunction, etc. Fiberglass reinforcement used in the production of laminated printed circuit boards typically is in the form of a fabric having a weight of about 6 to 8 ounces per yard, although fabrics as light as 2 ounces per yard are used for some applications. The fabric typically is woven from filaments having a diameter on the order of 0.00038 inch and the filaments are electrical grade (E) glass having high heat and electrical resistance properties.

The woven fabric is impregnated with a thermosetting epoxy resin, partially cured and laminated with a copper or other metallic foil and finally cured under high pressure and temperature. Various manufacturers of high pressure laminates use their own proprietary formulations which typically contain about 50 to 60 weight % fiberglass, about 35 to about 65 weight % epoxy resins and minor amounts of other chemical additives such as a bromide-type fire retardant. Most printed circuit boards include 1/16 to ⅛ inch thick panels. The copper or other metal cladding is first removed from the circuit board scrap, such as by an ammonia-carbon dioxide leaching process.

Figure 1:
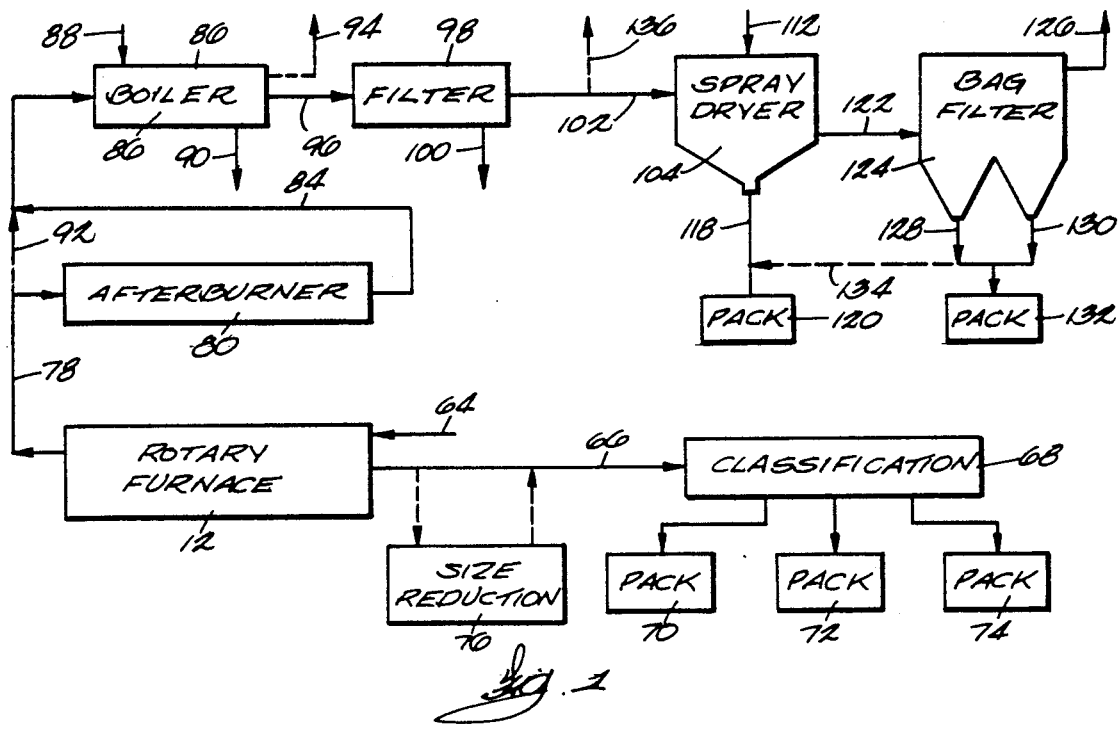
FIG. 1 is a diagramatic flow diagram illustrating a process of the invention for recovering fiberglass and bromide from epoxy-fiberglass laminates for printed circuit boards containing a bromide-type fire retardant.

Referring to FIGS. 1 and 2, comminuted scrap material is introduced via a feed hopper 10 into a direct- or indirectly-heated, elongated, calciner or rotary furnace 12. In the specific embodiment illustrated, the furnace 12 is indirectly-fired and has a generally cylindrical, stationary outer housing or shell 14 and a generally cylindrical heat cleaning drum 16 extending through the shell 14 and mounted for coaxial rotation about a generally horizontal axis 18. The shell 14 serves as an insulated heating jacket for the heat cleaning drum 16 and (FIG. 4) is lined with an insulated refractory material 20. The interior of the shell 14 is divided into a plurality of heating chambers 22, 24, 26 and 28 by a vertical barrier, such as a ceramic blanket (not shown).

The exterior of the heat cleaning drum 16 is heated by a plurality of gas-fired burners 32 mounted in the bottom portion of the shell 14. The heating chambers 22, 24, 26 and 28 are arranged so that the respective burners 32 heat reasonably well defined heating zones 34, 36, 38 and 40 of the heat cleaning drum 16.

As shown in FIG. 3, the burner flame is directed toward the bottom portion of the heat cleaning drum 16 and the exhaust gases circulate over the outer surface of the heat cleaning drum 16 in the direction of arrows 42. The exhaust gases are exhausted through a flue 44 for each heating chamber 22, 24, 26 and 28. With this arrangement, the rate of heating along the heat cleaning drum can be varied, if desired, by simply adjusting the flow of gas and air to the appropriate burners 32.

The heat cleaning drum 16 has radially extending exterior flanges 46 and 48 which are supported by a respective trunnion rollers 50 and 52 and the drum is slowly rotated by a motor 54 which is drivingly connected to a drive gear 56 on the inlet end 58 of the heat cleaning drum 16. The heat cleaning drum 16 is slightly inclined downwardly toward the outlet or discharge end 60 thereof. As shown in FIG. 3, the heat cleaning drum 16 includes a plurality of circumferentially-spaced, radially inwardly extending turning bars 62 for promoting tumbling of the scrap material as explained in more detail below.

The scrap material is conveyed from the feed hopper 10 into the first heating zone 34 of the heat cleaning drum 16 by a variable screw feeder 61. The scrap material is heated in the first heating zone 34 to a predetermined temperature above the vaporization point of the organic resin (e.g. epoxy) and other chemical additive(s) and below a point where the structural integrity of the inorganic reinforcement (e.g., fiberglass) is degraded. For many fiberglass fabric-reinforced epoxy laminates this temperature usually is about 850° to about 1050° F. At temperatures below 850° F., the epoxy and other chemical additives do not completely volatize rapidly enough. Temperatures above about 1050° F. can cause stress fractures in the surface of the glass filaments and, thus, degrade the structural integrity of the woven fiberglass fabric and ruin its value for reuse.

In the first heating zone 34, the temperature of the scrap material is raised to a temperature slightly below the maximum acceptable temperature for the particular material (e.g., 1020° F.) to quickly initiate volatilization of the organic resin. During the slow rotation of the heat cleaning drum 16, the gentle tumbling of the bed of scrap material is promoted by the turning bars 62 which can extend radially inwardly from the interior surface of the heat cleaning drum 16 approximately one inch or so.

As the bed of scrap material moves slowly through the heat cleaning drum 16 from first heating zone 34 towards the discharge end 60, it is maintained at a temperature slightly below the temperature in the first heating zone 34, for example, about 900° to about 975° F. Retention time of the scrap material in the heat cleaning drum 16 can be regulated by varying the rotational speed and pitch or downward incline of the heat cleaning drum 16. Generally, the retention time will be in the order of about 45 to about 75 minutes and the incline is about 1 to about 5 degrees.

A low volume of a purge gas, such as air, is introduced via a conduit 64 into the discharge end 60 of the heat cleaning drum 16 and flows toward the inlet end 58 countercurrently to the flow of the scrap material through the heat cleaning drum 16. The purge gas sweeps the dirty volatized gas away from the remaining bed of fiberglass fabric and minimizes contamination by condensation or other deposition of uncombusted hydrocarbons on the fiberglass fabric. It also can provide a source of oxygen for promoting oxidation of the organic resin, if needed.

It has been found that, without the use of a countercurrent flow of purge gas, the recovered fiberglass material tends to have a gray color with black specks and is friable. The tumbling provided in the heat cleaning drum 16 exposes all the surfaces of the scrap material to even heating and flow of purge gas, thereby promoting a more uniform and thorough removal of the vaporizable organic resin.

The size of the scrap material introduced into the heat cleaning drum 16 is not particularly critical, so long that it is small enough to provide adequate exposure to the heat for removal of substantially all of the organic resin. Generally, the maximum dimension of the scrap material is about 0.25 to about 2.0 inch. The scrap material recovered from metal-clad printed circuit boards typically is communited to some degree for the leaching process used to remove the metal. Such communition usually is sufficient for the material to be introduced into the heat cleaning drum 16 without further size reduction.

The "clean" fiberglass exits through the discharge end 60 of the heat cleaning drum 16 and passes through a conduit 66 to a suitable classification system 68 where it is separated into different size fractions which are conveyed to storage containers 70, 72 and 74 for further treatment or eventual packaging. The recovered fiberglass can be used as a reinforcement component in a wide variety of molded plastic parts, industrial coatings and adhesives or as a filler and extender in other products. If desired, the fiberglass discharged from the heat cleaning drum 16 can be further comminuted in a suitable size reduction means 76 prior to classification as illustrated in FIG. 1.

The purge gas carrying the volatized organic resin and other chemical additives (e.g., bromide-type flame retardant) passes through a sealed and insulated breech 78 on the inlet end 58 of the heat cleaning drum 16 and is introduced into a gas-fired afterburner 80. These gases are heated in the afterburner 80 to an elevated temperature (e.g., 1800° F.) high enough to obtain substantial complete combustion of residual combusted hydrocarbons. If required to obtain complete combustion of the hydrocarbons, an oxygen-containing gas, such as air, is introduced into the afterburner 80 in a suitable manner.

The flue gases exiting from the afterburner 80 through a flue 82 have a substantial heat content which can be recovered. If the scrap material is printed circuit boards including a bromide-type flame retardant, the flue gases contain the volatized bromide compound. In the specific embodiment illustrated, the flue gases from the afterburner 80 pass through a conduit 84 into a waste heat boiler 86. Water introduced into the boiler 86 through a conduit 88 is heated in the boiler by the flue gases and converted to steam which exits through a conduit 90 connected to the steam turbine of an electric generator, a building heating system or the like.

If desired, the gases exiting from the inlet end 58 of the heat cleaning drum 16 can be introduced directly into the boiler 86 as illustrated by dashed line 92 in FIG. 1. Instead of being used to generate steam as illustrated, the heat in the flue gases from the afterburner 80 can be used to dry materials or process gases by a non-contact heat exchanger or the like. For scrap material which does not contain a bromide-type flame retardant or other material which produces environmentally noxious vapors in the heat cleaning drum 16, the gases from the boiler 86 can be vented directly to the atmosphere after removal of undesirable particulate materials, if any, as illustrated by dashed line 94 in FIG. 1.

When the scrap material contains a bromide-type flame retardant or other valuable recoverable volatized material, the gases from the boiler 86 are routed through a conduit 96 to a suitable filter 98 for removal of particulate material and the separated material is discharged from the filter 98 through a conduit 100. The filtered gases exiting from the filter 98 are routed through a conduit 102 to a conventional spray dryer 104.

Figure 5:
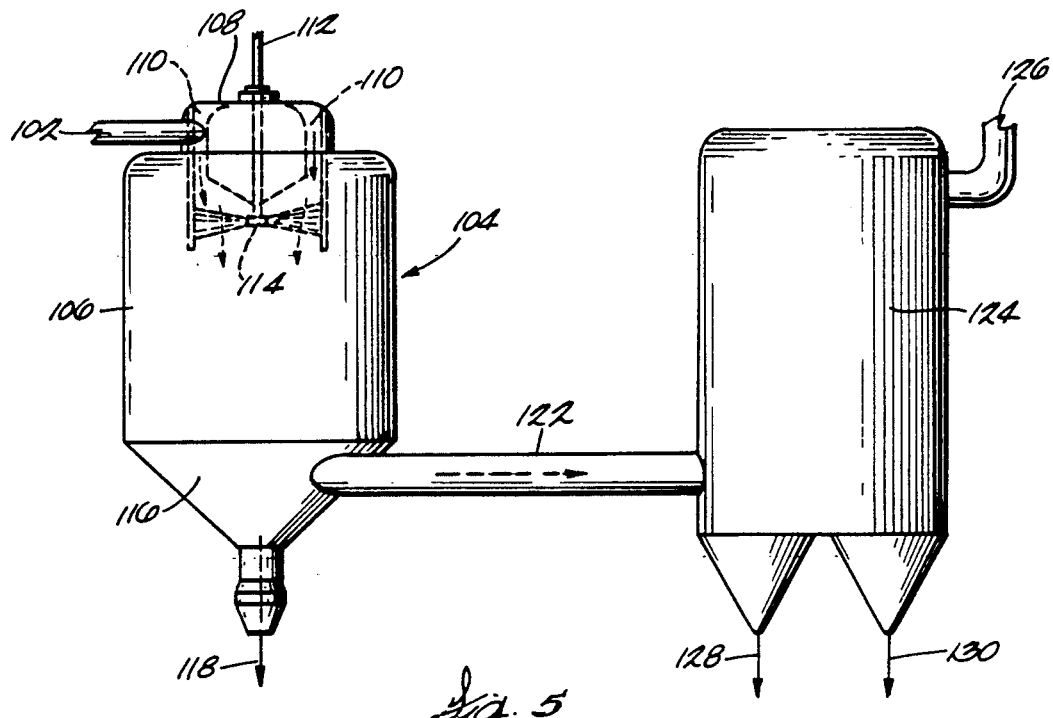
FIG. 5 is a diagrammatic representation of a spray dryer and bag filter system used in the process illustrated in FIG. 1.

Referring to FIG. 5, the spray dryer 104 includes a spray drying chamber 106, an inlet 108 for receiving the filtered gases from the filter 98, which usually are at a temperature in the order of 500° F., and a plurality of gas inlet ports 110 for introducing the filtered gas into the spray zone or upper portion of the spray drying chamber 106. A dispersion or slurry of sodium carbonate or another suitable akali or alkaline reactant capable of reacting with the volatized bromide compound or other recoverable compound(s) in the gas stream to produce a salt, such as sodium bromide, is introduced into the spray dryer 104 through a conduit 112. The reactant-containing slurry is sprayed into the spray zone through a spray nozzle 114. The spray nozzle 114 atomizes the reactant-containing slurry into minute droplets which are intimately contacted by the incoming gases. As the moist reaction product passes downwardly through the spray drying chamber 106, water is evaporated by the gas stream. A dry reaction product is produced by virtue of the gas stream temperature and residence time in the spray drying chamber 106.

Larger particles of the reaction product drop out of the gas stream, collect in the conically-shaped lower portion 116 of the spray drying chamber 106, removed through an outlet 118 and conveyed to a storage container 120 for further processing or packaging. A gas stream laden with finer particles of the reaction product flows from the bottom portion 116 of the spray drying chamber 106 through an exhaust duct 122 and is introduced into a bag filter system 124 for removal of fine reaction particles prior to being exhausted to the atmosphere through a conduit 126. The fine particles collected in the bag filter system 124 are removed via conduits 128 and 130 and conveyed to a storage container 132 for further processing or packaging. If desired, the fine particles from the bag filter system 124 can be combined with the larger particles from the spray dryer 104 as illustrated by the dashed line 134 in FIG. 1.

From the foregoing description, one skilled in the art can easily ascertain the essential characteristics of the invention and, without departing from the spirit and scope thereof, make various changes and modifications to adapt it to various usages.

We claim:

1. A process for reclaiming an inorganic reinforcement component from a scrap material including a vaporizable organic resin reinforced by said reinforcement component comprising the steps of:

introducing the scrap material in comminuted form into the inlet end of an elongated, rotary furnace;

heating the scrap material to a temperature above the vaporization point of the organic resin and below a point where the structural integrity of the reinforcement component is degraded while a bed of the scrap material is being tumbled inside the furnace and moves from the inlet end toward the outlet end of the furnace;

passing a flow of purge gas through the furnace and over the surfaces of the scrap material in a direction countercurrent to the movement of the bed of scrap material to sweep the volatized gases therefrom;

withdrawing the inorganic reinforcement component from the outlet end of the furnace; and withdrawing a stream of combined gases including the purge gas and the volatized gases from the inlet end of the furnace.

2. A process according to claim 1 wherein the scrap material includes fiberglass reinforced with an organic resin.

3. A process according to claim 2 wherein the bed of scrap material is heated to a temperature within the range of about 850° to about 1050° F.

4. A process according to claim 1 including the further steps of:

introducing the combined gases withdrawn from the furnace into an afterburner; and heating the combined gases in the afterburner at an elevated temperature for a time sufficient to complete the combustion of substantially all of the uncombusted hydrocarbons therein.

5. A process according to claim 2 wherein the scrap material includes a halide-containing compound and including the further steps of:

contacting a stream of the combined gases from the furnace with a reactant capable of reacting with the halide-containing compound to form a halide salt; and separating the resulting halide salt from the gas stream.

6. A process according to claim 5 including the steps of separating particulate materials from the stream of combined gases prior to contacting with the reactant.

7. A process according to claim 5 wherein the contacting step is carried out in a spray dryer and including the further steps of:

introducing the stream of combined gases into the spray zone of the spray dryer; and contacting the combined gases in the spray zone with an atomized liquid containing the reactant.

8. A process according to claim 7 wherein the liquid is water and the reactant is an alkali or alkaline reactant.

9. A process according to claim 1 including the steps of:

introducing the hot combined gases from the furnace into a heat exchanger means wherein the hot combined gases pass in heat exchange relationship with and heat a liquid medium.

10. A process for recovering fiberglass from a scrap material including a vaporizable organic resin reinforced by the fiberglass comprising the steps of introducing the scrap material in comminuted form into the inlet end of an elongated, rotary furnace;

heating the scrap material to a temperature of about 850° to about 1050° F. while a bed of the scrap material is being tumbled inside the furnace and moves from the inlet end toward the outlet end of the furnace;

passing a flow of purge gas through the furnace and over the surfaces of the scrap material in a direction countercurrent to the movement of the bed of scrap material to sweep the volatized gas therefrom;

withdrawing fiberglass reinforcement material from the outlet end of the furnace;

withdrawing a stream of combined gases including the purge gas and the volatized gases from the inlet end of the furnace;

introducing the combined gases withdrawn from the furnace into an afterburner; and heating the combined gases in the afterburner at an elevated temperature for a time sufficient to complete the combustion of substantially all of the hydrocarbons therein.

11. A process according to claim 10 wherein said scrap material includes a bromide-containing additive and including the further steps of:

withdrawing a stream of exhaust gases from the afterburner;

contacting the stream of gases from the afterburner with a reactant capable of reacting with the volatized bromide-containing compound to form a bromide salt; and separating the resulting bromide salt from the gas stream.

12. A process according to claim 11 wherein the contacting step is carried out in a spray dryer and includes the further steps of:

introducing the stream of combined exhaust gases from the afterburner into the spray zone of the spray dryer; and contacting the exhaust gas stream in the spray zone with an atomized liquid containing the reactant.

13. A process according to claim 12 wherein the liquid is water and the reactant is an alkali or alkaline reactant.

* * * * *